United States Patent
Ruan et al.

(10) Patent No.: US 12,136,718 B2
(45) Date of Patent: Nov. 5, 2024

(54) VARIABLE THERMAL RESISTORS, SYSTEMS, AND METHODS FOR MODULATING HEAT TRANSPORT

(71) Applicant: Purdue Research Foundation, West Lafayette, IN (US)

(72) Inventors: Xiulin Ruan, West Lafayette, IN (US); Amy Marie Marconnet, West Lafayette, IN (US); Tingting Du, Jinan (CN); Luis Delgado, State College, PA (US)

(73) Assignee: Purdue Research Foundation, West Lafayette, IN (US)

( * ) Notice: Subject to any disclaimer, the term of this patent is extended or adjusted under 35 U.S.C. 154(b) by 485 days.

(21) Appl. No.: 17/485,630

(22) Filed: Sep. 27, 2021

(65) Prior Publication Data

US 2022/0102775 A1    Mar. 31, 2022

Related U.S. Application Data

(60) Provisional application No. 63/083,303, filed on Sep. 25, 2020.

(51) Int. Cl.
| | | |
|---|---|---|
| *H01M 10/6551* | (2014.01) | |
| *H01M 10/613* | (2014.01) | |
| *H01M 10/653* | (2014.01) | |

(52) U.S. Cl.
CPC ..... *H01M 10/6551* (2015.04); *H01M 10/613* (2015.04); *H01M 10/653* (2015.04)

(58) Field of Classification Search
CPC .......... H01M 10/6551; H01M 10/613; H01M 10/653; H01M 10/6571; Y02E 60/10
See application file for complete search history.

(56) References Cited

U.S. PATENT DOCUMENTS

| | | | | |
|---|---|---|---|---|
| 2008/0203081 | A1* | 8/2008 | Eickhoff | G05D 23/121 |
| | | | | 219/385 |
| 2008/0304540 | A1* | 12/2008 | Danley | G01K 17/00 |
| | | | | 374/185 |
| 2014/0110049 | A1* | 4/2014 | Yuen | H01L 23/373 |
| | | | | 156/60 |
| 2014/0116661 | A1* | 5/2014 | Xu | H01L 23/3733 |
| | | | | 29/890.03 |
| 2016/0019995 | A1* | 1/2016 | Zhamu | C01B 32/182 |
| | | | | 427/122 |
| 2017/0182474 | A1* | 6/2017 | Zhamu | B01J 20/20 |
| 2020/0170149 | A1* | 5/2020 | Kim | G01K 7/22 |
| 2021/0296716 | A1* | 9/2021 | Zhamu | H01M 10/613 |
| 2021/0305639 | A1* | 9/2021 | Zhamu | H01M 10/6551 |
| 2021/0313634 | A1* | 10/2021 | Zhamu | H01M 10/425 |
| 2021/0376409 | A1* | 12/2021 | Zhamu | H01M 50/20 |
| 2023/0243525 | A1* | 8/2023 | Fix | B01D 71/80 |
| | | | | 95/52 |

* cited by examiner

*Primary Examiner* — Muhammad S Siddiquee
(74) *Attorney, Agent, or Firm* — Hartman Global IP Law; Gary M. Hartman; Domenica N. S. Hartman

(57) ABSTRACT

Variable thermal resistors, systems, and methods suitable for modulating heat transport between a heat source and a heat sink based on a degree of compression of a reversibly-compressible, open-pore graphene foam within the variable thermal resistors. The variable thermal resistor is configured to controllably vary heat transport therethrough by controlling the degree of compression of the graphene foam.

10 Claims, 13 Drawing Sheets

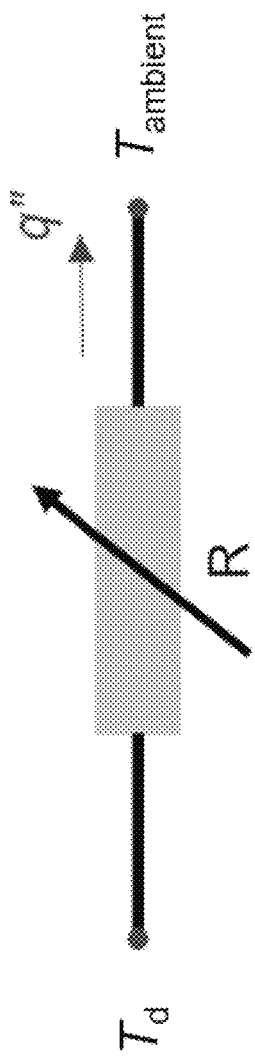
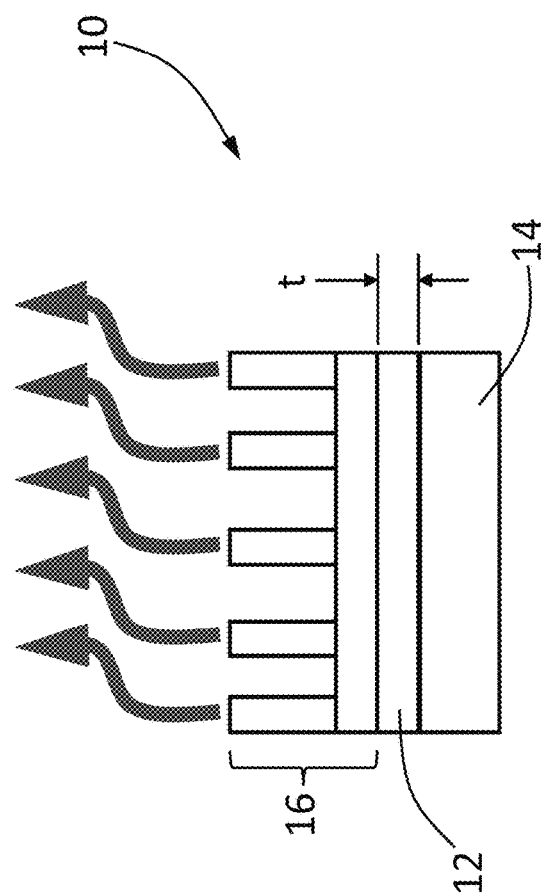
FIG. 2A
FIG. 2B

VARIABLE THERMAL RESISTORS, SYSTEMS, AND METHODS FOR MODULATING HEAT TRANSPORT

CROSS-REFERENCE TO RELATED APPLICATIONS

This application claims the benefit of U.S. Provisional Application No. 63/083,303 filed Sep. 25, 2020, the contents of which are incorporated herein by reference.

BACKGROUND OF THE INVENTION

The present invention generally relates to heat management systems of heat-generating devices, including but not limited to batteries. The invention particularly relates to variable thermal resistors, systems, and methods suitable for modulating heat transport between a heat source and a heat sink based on a degree of compression of a graphene foam within the variable thermal resistors.

Thermal runaway and low-temperature performance degradation are major thermal issues for batteries in electronics, space applications, electric vehicles, and buildings and lead to serious safety risks and poor performance. Depending on climate and operating conditions, batteries in such systems need effective heat dissipation pathways to dissipate heat that is inherently generated by batteries, or good thermal insulation (in low-temperature environment, for instance) to ensure reliable operation and optimal performance. However, thermal solutions that are beneficial across a range of operating conditions, such as at both high and low ambient temperatures, are still a challenge. Besides battery thermal management, other applications like space conditioning, vehicle thermal comfort, and thermal energy storage would benefit from controllable thermal conduction pathways.

Switchable regulation of a heat dissipation pathway between a heat source and a heat sink has the potential to achieve dynamic control of operating temperatures. A thermal switch, analogous to electrical switches that modulate current flow, tunes heat flux by changing thermal conductance of two terminal components at "on" and "off" states. Beyond thermal switches with such sharp states transition, continuous and dynamic control of thermal conductance would be desirable for thermal management applications and so called "thermal regulators" but need to be developed.

Past attempts to modulate thermal conductance have focused on developing a variety of thermal switches and thermal regulators. Gas-gap thermal switches physically make and break thermal contact between two components, leading to a large ratio of the thermal conductance between the contacting (closed or "on" state) and non-contacting (open or "off" state) conditions. Avoidance of mechanically moving parts can be achieved with liquid droplet-based thermal switches, which comprise droplets actuated by an external field to move or jump across a micro-scale gap to contact a hot spot. Thermal switches and thermal regulators based on phase change or phase transition leverage differences in thermal conductance between two states of a material, and a switching ratio of about ten times has been achieved. Thermal switches utilizing electrochemical intercalation or hydration have also been developed. However, thermal switches do not have access to continuous tuning of the thermal conductance due to their binary "on" and "off" states.

All solid-state thermal regulation devices have also attracted much attention. One type of solid-state thermal regulator exploits the effect of a thermal transport pathway at the boundary between a metal and a thermal insulator to enable effective transfer heat only in one direction while the heat flow in the opposite direction is hindered, behaving as a type of thermal diode. Current state-of-the-art all solid-state regulators are generally reliable and compact, but their switching ratios are relatively low and the devices can only operate in a narrow temperature window.

As such, it can be appreciated that it would be desirable if systems and methods were available that were capable of providing efficient thermal management of a heat source, such as heat-generating devices including but not limited to batteries in applications such as electronics, space applications, electric vehicles, and buildings.

BRIEF DESCRIPTION OF THE INVENTION

The present invention provides variable thermal resistors, systems, and methods suitable for modulating heat transport between a heat source and a heat sink based on a degree of compression of a reversibly-compressible, open-pore graphene foam within the variable thermal resistors.

According to one aspect of the invention, a variable thermal resistor is provided that includes a reversibly-compressible, open-pore graphene foam. The variable thermal resistor is configured to controllably vary heat transport therethrough by controlling a degree of compression of the graphene foam.

According to another aspect of the invention, a system is provided that includes a heat source, a heat sink, and a heat dissipation pathway for heat transport between the heat source and the heat sink. The heat dissipation pathway includes a variable thermal resistor comprising a reversibly-compressible, open-pore graphene foam. The variable thermal resistor is configured to controllably vary heat transport therethrough by controlling a degree of compression of the graphene foam.

According to another aspect of the invention, a method is provided for controlling heat transport between a heat source and a heat sink. The method includes controlling a degree of compression of a reversibly-compressible, open-pore graphene foam of a variable thermal resistor.

According to another aspect of the invention, a method is provided for controlling a heat dissipation pathway coupling a heat source and a heat sink. The method includes providing a variable thermal resistor within the heat dissipation pathway. The variable thermal resistor comprises a reversibly-compressible, open-pore graphene foam. The method further includes controlling a degree of compression of the graphene foam of the variable thermal resistor to control heat transport through the variable thermal resistor.

Technical effects of a variable thermal resistor, system, and methods as described above preferably include the ability to provide efficient thermal management for heat sources, such as batteries, in various applications such as but not limited to electronics, space applications, electric vehicles, and buildings.

Other aspects and advantages of this invention will be appreciated from the following detailed description.

BRIEF DESCRIPTION OF THE DRAWINGS

FIGS. 2A and 2B schematically represent a variable thermal resistor in accordance with nonlimiting certain aspects of the invention. FIG. 2A is a schematic electrical representation of a variable thermal resistor and FIG. 2B is a schematic physical representation of a variable thermal resistor and a reversibly-compressible, open-pore graphene foam thereof.

FIG. 2C schematically represents a dual function capability of a variable thermal resistor represented in FIGS. 2A and 2B as both a thermal switch and a thermal regulator arising from the reversibly-compressible, open-pore graphene foam of the variable thermal resistor. In FIG. 2C, a shaded region is bounded by two solid lines that indicate the thermal performance of the variable thermal resistor in "on" and "off" states ($G_{on}$ and $G_{off}$, respectively) with the slopes of these lines being the thermal conductance in the "on" and "off" states. The shaded region indicates an operating region accessible with continual tuning of the thermal conductance of the variable thermal resistor. As the power level or heat flux varies, the temperature of the variable thermal resistor can be regulated through modulation of the thickness of the graphene foam (along the dashed vertical line). Similarly, if a specific heat flux must be regulated, the thickness of the graphene foam can be controlled as the temperature varies (along the dashed horizontal line).

FIG. 3A represents a higher magnification SEM image and FIG. 3B represents a lower magnification SEM image of the graphene foam illustrating a typical pore size of the graphene foam and an interconnected network of graphene fabricated by chemical vapor deposition.

FIG. 4A represents a schematic of an infrared (IR) reference bar setup used during investigations leading to the present invention, and represents a three-layer structure comprising a graphene foam ("Sample") sandwiched between two layers of material with known thermal conductivity ("Reference"). The three-layer structure served as an experimental variable thermal resistor. The investigations evaluated the graphene foam composite when compressed to different thicknesses. The three-layer structure was placed between two adapter bars that spanned between two heat sources ("Heaters A" and "Heaters B") used in combination to achieve a uniform temperature in the three-layer structure for calibration of emissivity. The setup also included a heat sink ("Chiller"). During testing, the Heaters A and the Chiller were used to establish a temperature gradient across the three-layer structure. An IR microscope was used to measure the two-dimensional (2-D) temperature map of the top surface of the three-layer structure. The graphene foam was compressed by operating a "Caliper" to compress the three-layer structure. The emissivity was calibrated and a new temperature map was captured by the IR microscope after the compression of the three-layer structure to measure properties as a function of compression. FIG. 4B represents the total temperature drops from the hot to cold side of the graphene foam at each thickness as a function of heat flux. The shaded region illustrates the tunable range of temperature and heat flux via continuous compression. The dashed lines indicate the ability to stabilize the heat flux and the temperature in an allowed temperature range and an allowed heat flux range, respectively. FIG. 4C represents the thermal conductance as a function of compression. Here, $d_{gf}$ is the thickness of the graphene foam in states ranging from an uncompressed state to a fully-compressed state. The switching ratio between the fully-compressed and uncompressed states was about 8.09 at a maximum strain of about 85%. FIG. 4D plots measured thermal conductivity and results of a scaled molecular dynamics (MD) simulation compared with predictions from a conventional effective medium theory (EMT) analysis and a proposed spring model. The IR microscope measurement is bounded by the EMT and the proposed spring model. FIG. 4E are images showing side views of a simulation domain in the MD simulations of black carbon atoms on a white background in uncompressed (left) and compressed (right) states.

FIG. 5A represents the temperature of the variable thermal resistor as a function of ambient temperature at each thickness of the graphene foam, for a constant heat flux. The temperature differences between the variable thermal resistor and the surrounding environment at the uncompressed and fully-compressed states were 17.4° C. and 7.0° C., respectively, resulting in a switching ratio of about 2.5. The temperature window over which the temperature could be controlled was about 10° C. from the minimum to maximum $T_d$ at each ambient temperature level at this heat flux (the range between the center and rightmost vertical dashed lines) and was extended to 20.4° C. (the range between the leftmost and rightmost vertical dashed lines) when the operating temperature was in a range from 20° C. to 30° C. (represented by the shaded area). FIG. 5B represents a contour plot showing the capacity of graphene foam for continuous temperature regulation with varying ambient temperatures. To achieve a constant temperature for the variable thermal resistor, the thickness of the graphene foam, $d_{gf}$, was adjusted following one of the isotherms as the ambient temperature was varied. FIG. 5C represents the temperature of the variable thermal resistor as a function of the heat flux at different thicknesses of the graphene foam. FIG. 5D represents a contour plot showing the capacity of graphene foam for continuous regulation based on heat load. To maintain a particular temperature for the variable thermal resistor above the ambient temperature, the thickness of the graphene foam was controlled following the isotherms as the input heat flux was varied.

FIG. 6A represents the temperature difference ($\Delta T_{d\text{-}amb}$) ambient and the variable thermal resistor at uncompressed and fully-compressed states of the graphene foam during cycling. The graphene foam was stable with very small temperature deviation of each test point. FIG. 6B represents exemplary transient temperature responses for the variable thermal resistor during one cycle of compression. The time to steady state when transitioning from the "on" (compressed) to "off" (uncompressed) state was about twenty-two minutes, while transitioning from "off" to "on" was about eleven minutes.

FIG. 7A represents a schematic of a three-layer structure ("Graphene foam" between two "Acrylic coated by graphite") illustrating the direction of heat flow and compression. FIG. 7B represents 2-D temperature maps for the fully uncompressed (bottom) and fully-compressed (top)

Figure 1B:
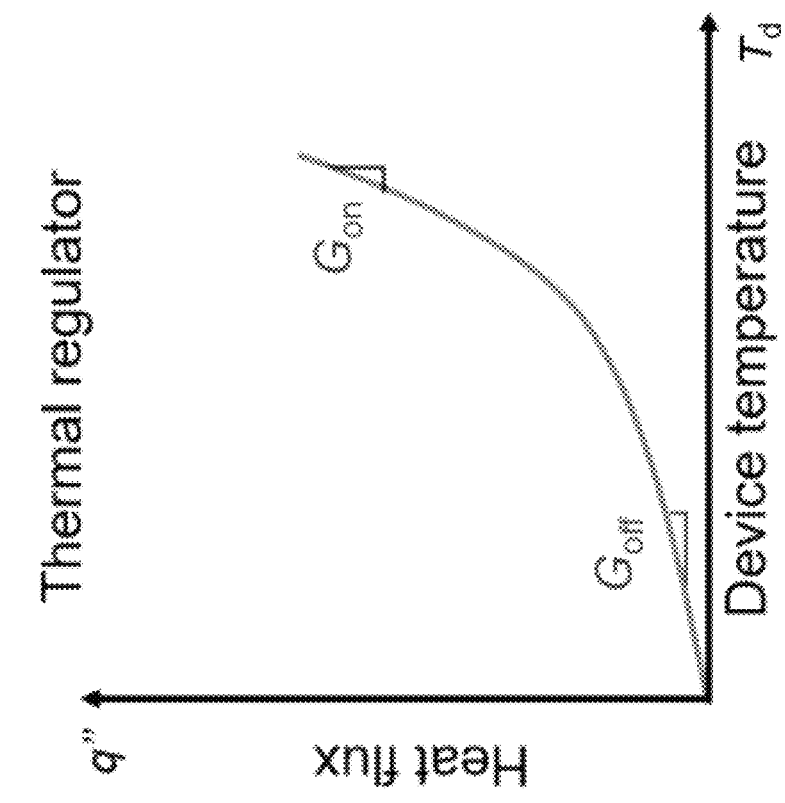
FIG. 1B represents a conventional thermal regulator that has a non-linear thermal performance curve evidencing that the thermal regulator passively transitions between a low thermal conductance state ("off") and a high thermal conductance state ("on") based on the operating conditions of the thermal device.

states of the graphene foam ("GF") and the corresponding one-dimensional (1-D) temperature profiles. The reduced temperature difference across the three-layer structure indicated an increase of thermal conductance after compression. As illustrated in the 1-D profiles (i.e., the lack of a temperature jump at the interfaces), the interfacial resistance between the graphene foam (GF) and each reference layer ("Acrylic") was negligible compared to the thermal resistance of the graphene foam itself.

DETAILED DESCRIPTION OF THE INVENTION

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also describes certain investigations relating to the embodiment(s) depicted in the drawings, and identifies certain but not all alternatives of the embodiment(s) depicted in the drawings.

Disclosed herein are wide-range variable thermal resistors that utilize highly compressible, reversibly-compressible, open-pore graphene foams, that can function as both thermal switches and thermal regulators as may be desired. A variable thermal resistor is schematically represented in FIG. 2A as a thermal analogy to a variable electrical resistor. FIG. 2B is a schematic physical representation of a variable thermal resistor 10, shown as comprising a foam member 12 between a heat source 14 and a heat sink 16. According to nonlimiting but preferred aspects of the invention, the foam member 12 is a reversibly-compressible, open-pore graphene foam that, when placed between the heat source 14 and heat sink 16, is capable of modulating the allowed heat transport based on the degree of its compression, for example, in a thickness (t) direction of the foam member 12. When fully compressed, the foam member 12 is significantly more conductive (an "on" state) than when fully uncompressed (an "off" state). Unlike conventional thermal switches, with only "on" and "off" states, partially compressing the foam member 12 provides access to intermediate thermal conductances. Further, the variable thermal resistor 10 can be modulated with external active controls to constant uniform temperatures in varying environments and with varying heat loads. Experimental investigations leading to aspects of the present invention demonstrated a large tuning range of about eight times through measurements of the intrinsic thermal resistance of a graphene foam composite within a variable thermal resistor and demonstrated the practical performance for temperature tuning and heat transfer regulation in an environmental chamber where the ambient temperature was varied from 0° C. to 30° C. Cyclic tests further demonstrated the reliability of the variable thermal resistor.

As a nonlimiting example, a variable thermal resistor utilized in the investigations comprised a foam member 12 produced by growing graphene foam by chemical vapor deposition (CVD). The graphene foam used in the investigations was in the form of what will be referred to herein as a graphene foam composite. The particular graphene foam composite used in the investigations was commercially obtained from Graphene Supermarket Products and had a thickness (t) of about 1.2 mm and a density of about 85 mg cm'. In this product, the CVD-grown graphene foam is reported to be embedded with polydimethylsiloxane (PDMS) that was infiltrated into the graphene foam, yielding a foam composite in which the PDMS serves as a scaffold or binder for the graphene foam. It has been reported that infiltration with an elastomer such as PDMS serves to enhance the mechanical properties, for example, elasticity and durability, of an otherwise freestanding 3-D graphene foam that may be relatively fragile, promoting desirable high compressibility and reversible compressibility characteristics of the graphene foam composite. The composition of the resulting graphene foam composite is reported to be about 95% graphene and about 5% PDMS. Though PDMS in an amount of 5% was used as a scaffold or binder for the graphene foam, it is foreseeable that other elastomeric scaffold/binder materials could be used and greater and lesser amounts of elastomeric scaffold/binder materials could be used. Furthermore, it is possible that an elastomeric scaffold/binder material could be omitted.

Figure 3B:
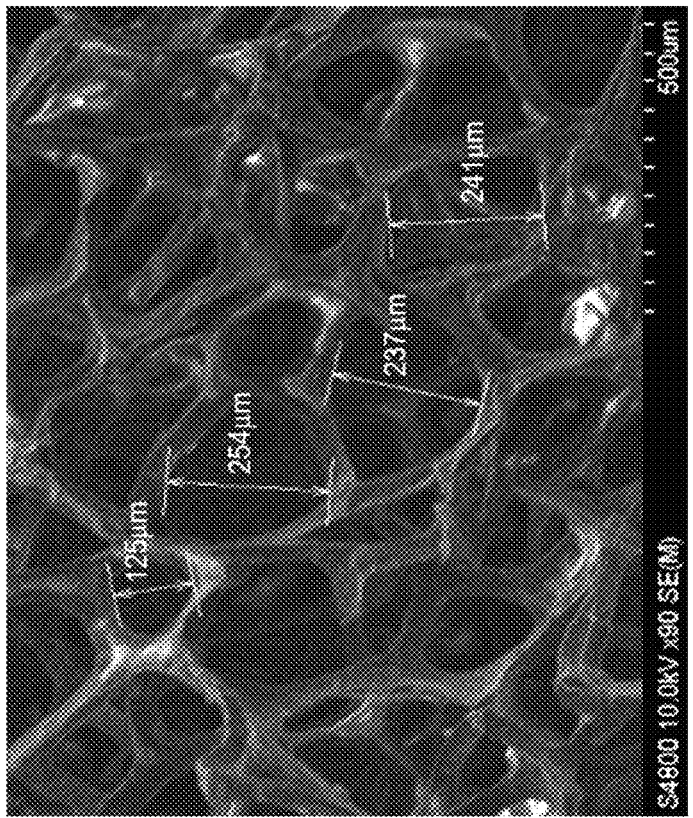
FIGS. 3A and 3B include images of an open-pore graphene foam viewed with scanning electron microscopy (SEM).
Figure 3A:
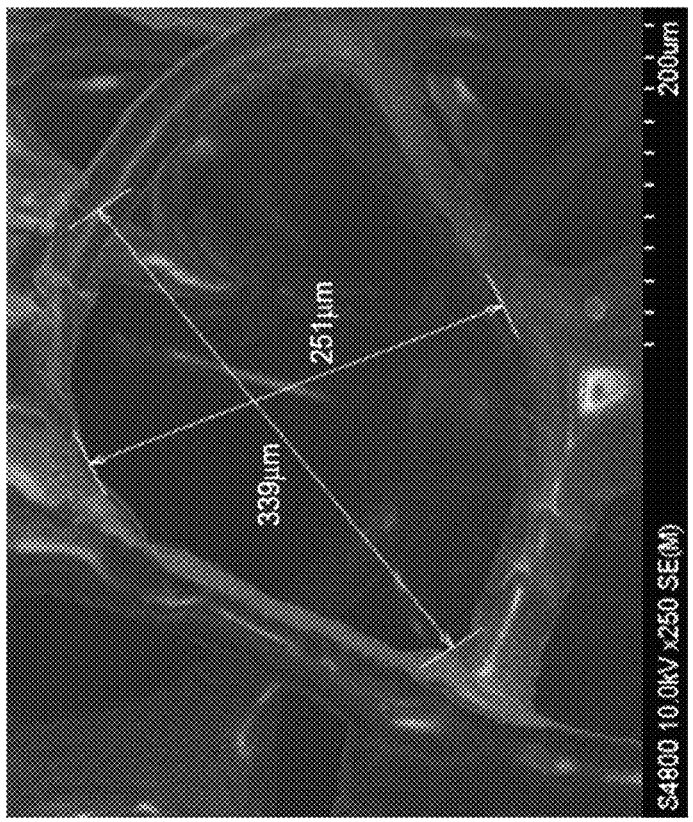

The graphene foam composite is shown in FIGS. 3A and 3B to have macroscale open pores and interconnected networks of graphene. The pore size at the initial uncompressed state shown in FIGS. 3A and 3B was measured to be about 125 to about 350 μm. Due to the compressibility of the graphene foam composite, its thermal conductance varied with thickness. At the uncompressed state, the graphene foam composite provides good thermal insulation due to the low volume fraction of graphene and air within in pores, resulting in pathways for heat transfer that are less effective. As the graphene foam composite is compressed, the air in pores is squeezed out and the volume fraction of graphene increases, resulting in the pathways for heat transfer becoming more effective.

Figure 1A:
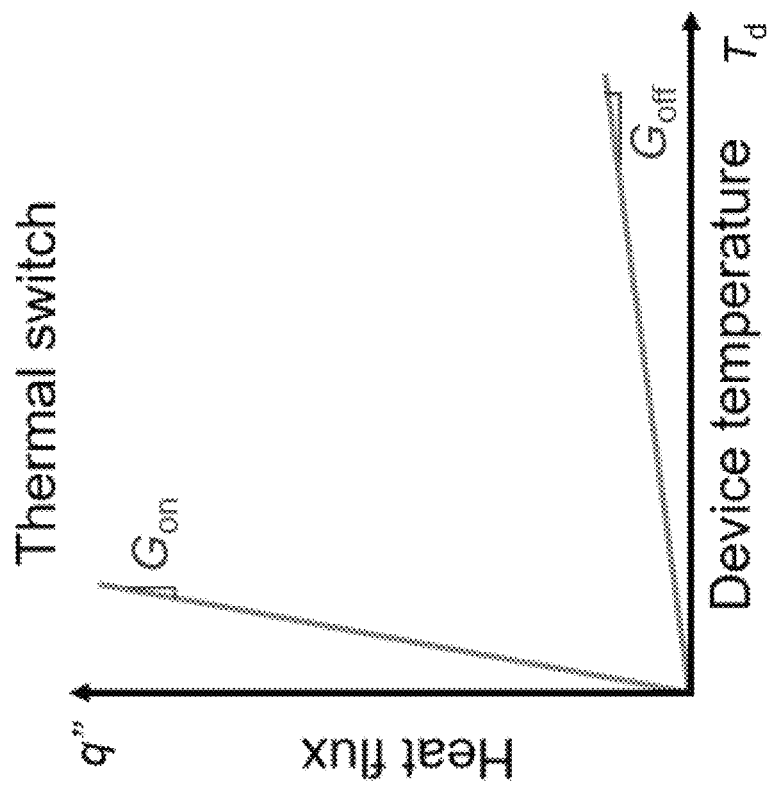
FIG. 1A represents working principles of a conventional thermal switch that only has two possible thermal conductance states ("on" and "off)

A variable thermal resistor equipped with the graphene foam composite was determined to function significantly differently from traditional thermal switches and thermal regulators. Thermal switches and thermal regulators are used to maintain heat sources, such as batteries, at an optimal temperature during operation with varied heat load and ambient conditions. As represented in FIG. 1A, thermal switches jump between low and high thermal conductance states when activated, while FIG. 1B represents that a thermal regulator has a non-linear relationship between heat flux and temperature which keeps a heat source at a constant temperature by modulating the heat flux (often passively).

When considering thermal devices such as thermal switches and thermal regulators, the ratio of heat flux to temperature difference across the thermal device is defined as thermal conductance (G):

$$G = \frac{q''}{\Delta T}, \quad (1)$$

For thermal switches, the thermal conductance is significantly different in the "on" and "off" states (FIG. 1A). The figure of merit for switches, the switching ratio r, is defined as the ratio of these two thermal conductances:

$$r = \frac{G_{on}}{G_{off}} = \frac{q''_{on}/\Delta T_{on}}{q''_{off}/\Delta T_{off}}, \quad (2)$$

where q" and ΔT are the heat flux and the temperature difference across the graphene foam composite and the subscripts indicate the "on" and "off" states. The higher the switching ratio, the more effective the system is at modulating the heat flux.

For thermal regulators (FIG. 1B), the relationship between heat flow and temperature of the graphene foam composite is non-linear, and the thermal conductance at a particular operating condition is defined as $$G = \frac{\partial q''}{\partial \Delta T}, \quad (3)$$

Here the "on" and "off" states are passively determined by the current operating conditions and a switching ratio can be defined as a figure of merit as in Equation 2.

Figure 2C:
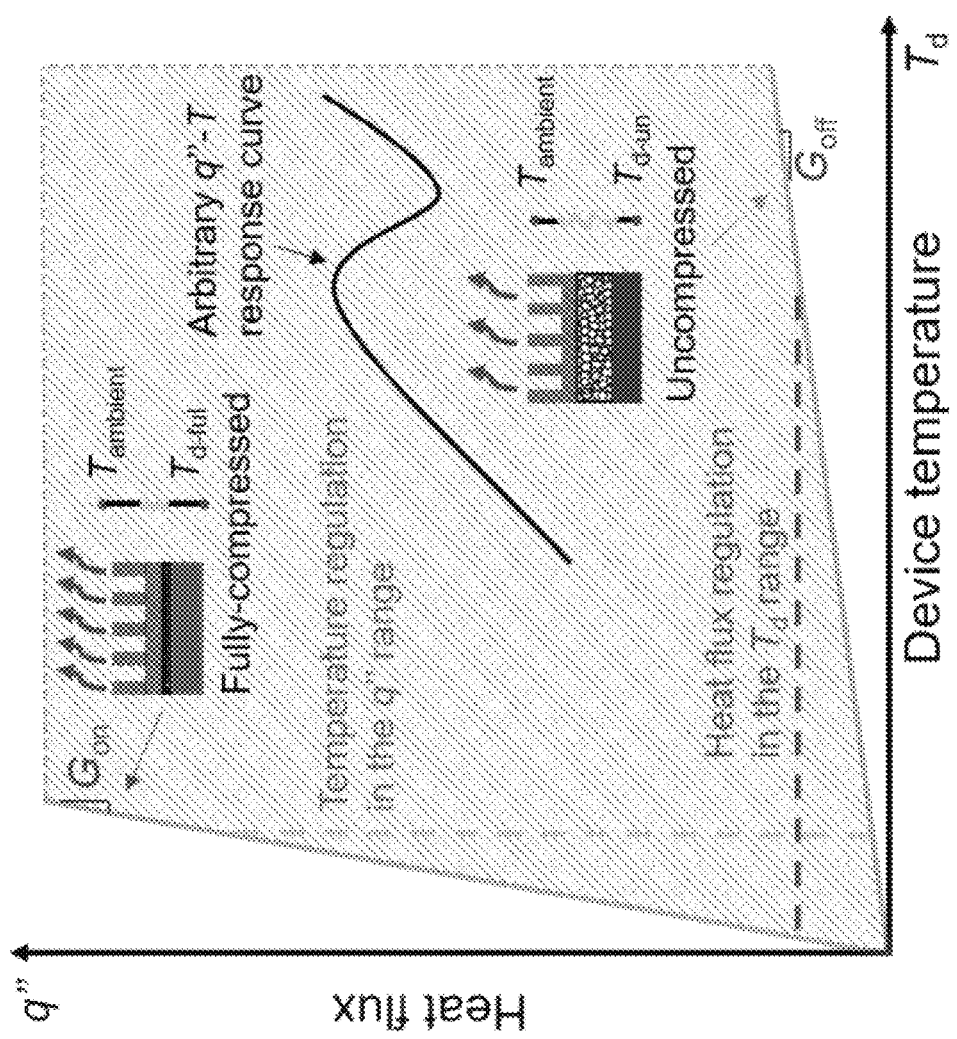
FIG. 2C represents working principles of a variable thermal resistor in accordance with nonlimiting certain aspects of the invention.

In comparison to the traditional thermal switches and thermal regulators, the wide-range variable thermal resistor described herein, schematically shown in FIGS. 2A and 2B, simultaneously offers the benefits of large tuning range and continuous tuning. The variable thermal resistor is capable of having properties of a thermal switch with a minimum and maximum achievable thermal conductance in the "off" and "on" states, respectively, but is also capable of achieving intermediate states as indicated by the shaded area in FIG. 2C. Thus, the variable thermal resistor can also function as a thermal regulator to maintain a heat-generating device at a constant temperature in varying ambient conditions and with varying heat loads. Therefore, in addition to the switching ratio, the available "temperature window" in which the variable thermal resistor can operate at a particular heat flux (vertical dashed line) and the "heat flux window" where the temperature of the variable thermal resistor can remain constant (horizontal dashed line) are defined as performance metrics, as shown in FIG. 2C. The variable thermal resistor can also realize any arbitrary q"–T response curve as long as it is within the shaded area of FIG. 2C, opening possibilities for a range of applications.

Nonlimiting embodiments of the invention will now be described in reference to experimental investigations leading up to the invention.

Figure 4A:
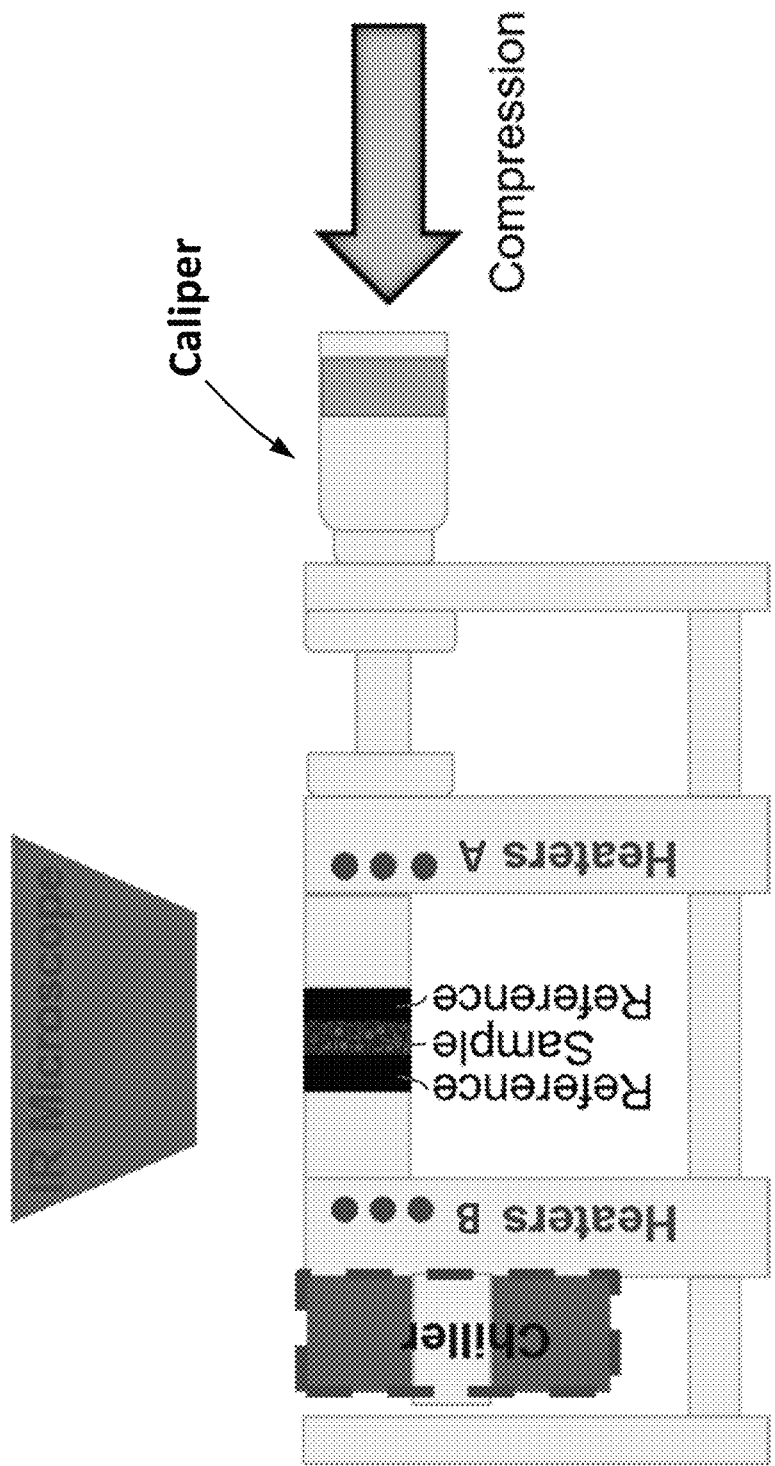
FIGS. 4A through 4E represent a thermal property characterization experimental setup and results.

A variable thermal resistor was assembled with the above-noted exemplary graphene foam composite and tested for its thermal properties across a range of compression levels using a high-resolution infrared (IR) microscope and a method based on the ASTM D5470 standard as illustrated in FIG. 4A. The experimental variable thermal resistor is schematically represented in FIG. 4A as comprising the graphene foam composite ("Sample") between two layers of an acrylic material having a known thermal conductivity ("Reference"), yielding a three-layer structure. At different compression levels, which resulted in the graphene foam composite being compressed to different thicknesses, a temperature gradient was established across the graphene foam composite. The slope in the graphene foam composite and the total temperature drop at each thickness was extracted to understand the impact of contact thermal resistances. FIG. 4A illustrates the IR microscopy testing system, and FIG. 7A shows a schematic of the test section with the direction of heat flow and compression. In FIG. 7A, "Hot Side" refers to the "Heaters A" in FIG. 4A that served as a heat source, and "Cold Side" refers to the "Chiller" in FIG. 4A that served as a heat sink. Cartridge heaters and a liquid-cooled heat sink were employed as the Heaters A and Chiller, respectively. As schematically represented in FIGS. 4A and 7A, the graphene foam composite and two acrylic layers of the three-layer structure had the same cross-sectional areas. The surfaces of the acrylic layers were spray-coated with a thin layer of graphite to achieve uniform emissivity and to decrease the uncertainty in the IR temperature measurements. To calibrate the spatially varying emissivity, a radiance image was taken after the graphene foam composite is heated to a known and uniform temperature, and then the emissivities of the graphene foam composite and acrylic layers were calculated at each pixel by comparing their radiance to that of a blackbody at the reference temperature. After calibration of the emissivity with the graphene foam composite at a uniform temperature, a temperature difference was established across the three-layer structure and the 2-D temperature map of surface was captured with a spatial resolution of 5 μm/pixel and a temperature resolution of about 0.1 K.

Figure 7B:
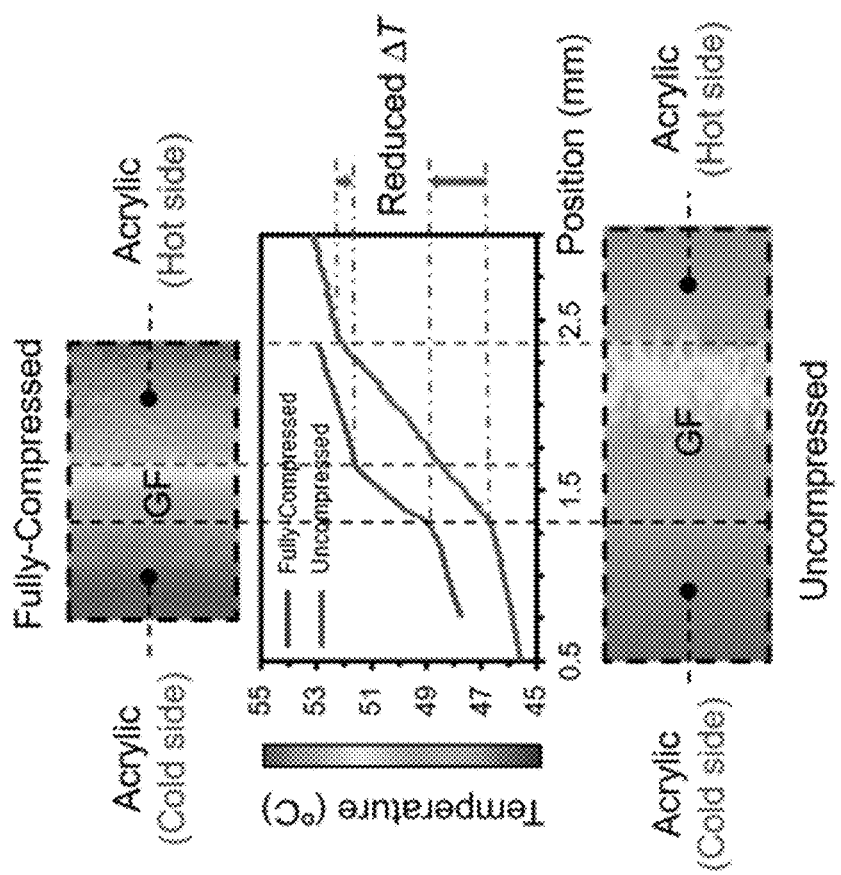
FIGS. 7A and 7B represent thermal property characterization and uncertainty quantification of the variable thermal resistor.
Figure 7A:
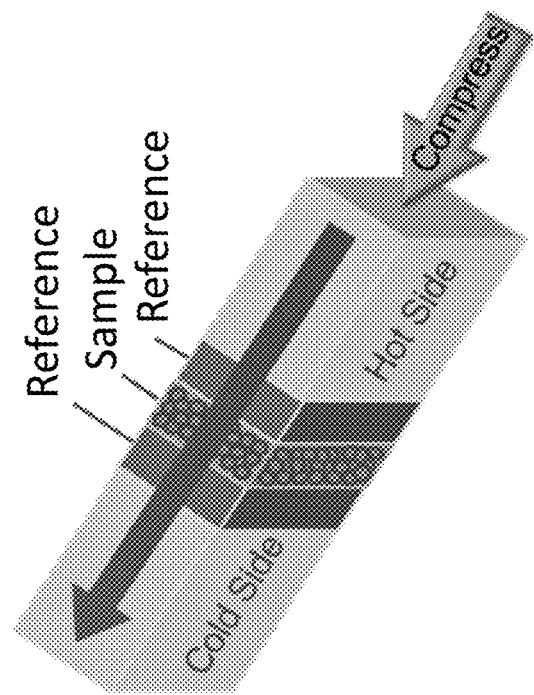

The 1-D temperature profile was calculated by averaging the 2-D temperature map in the direction perpendicular to the heat flow at the steady state (see FIG. 7B). Based on Fourier's Law, the heat flux was calculated from the temperature gradient in the reference and the thermal conductivity of the acrylic layers. The total temperature drop across the three-layer structure can be identified from the temperature profile including the temperature jump at the left and right interface if significant. The thermal conductance of the graphene foam composite, G, can be expressed as follows:

$$G = \frac{1}{R''} = \frac{k_{ref} \frac{dT}{dx}\Big|_{ref}}{\Delta T}, \quad (4)$$

For each thickness of the graphene foam composite, temperature maps were captured at five heater power levels. In this experiment, for each compression level, temperature maps were recorded at six heat fluxes (about 100 to 1600 kW m$^{-2}$). The average thickness of the compressed graphene foam composite during each test was measured from the thermal images. The thickness of the graphene foam composite was measured as the distance between the two interfaces identified in the temperature profile. At the uncompressed state, a small pressure was required to hold the three-layer structure in place—thus, the initial thickness of the graphene foam composite was slightly smaller than that of the graphene foam composite outside of the measurement system. The minimum compressible thickness varied depending on the maximum load on the entire three-layer structure. FIG. 7B shows the temperature profile at uncompressed and fully-compressed states of the graphene foam composite at the same input power. The apparatus represented in FIG. 4A was not designed to apply large forces, and therefore the term "fully-compressed" as used herein refers to the smallest thickness that was achieved with the experimental setup. After compression, the temperature difference between two interfaces decreased, which means the thermal conductance of the graphene foam composite had increased. The ratio of thermal conductance at the fully-compressed and uncompressed state of the graphene foam composite was taken as the figure of merit (Equation 5):

$$r = \frac{G_{fully-compressed}}{G_{uncompressed}}, \quad (5)$$

The combined uncertainty in the thermal conductance of the graphene foam composite at three different compression levels was about 9.50% at a thickness of 1.180 mm, about 9.32% at a thickness of 0.724 mm, and about 8.93% at a thickness of 0.179 mm.

Figure 4B:
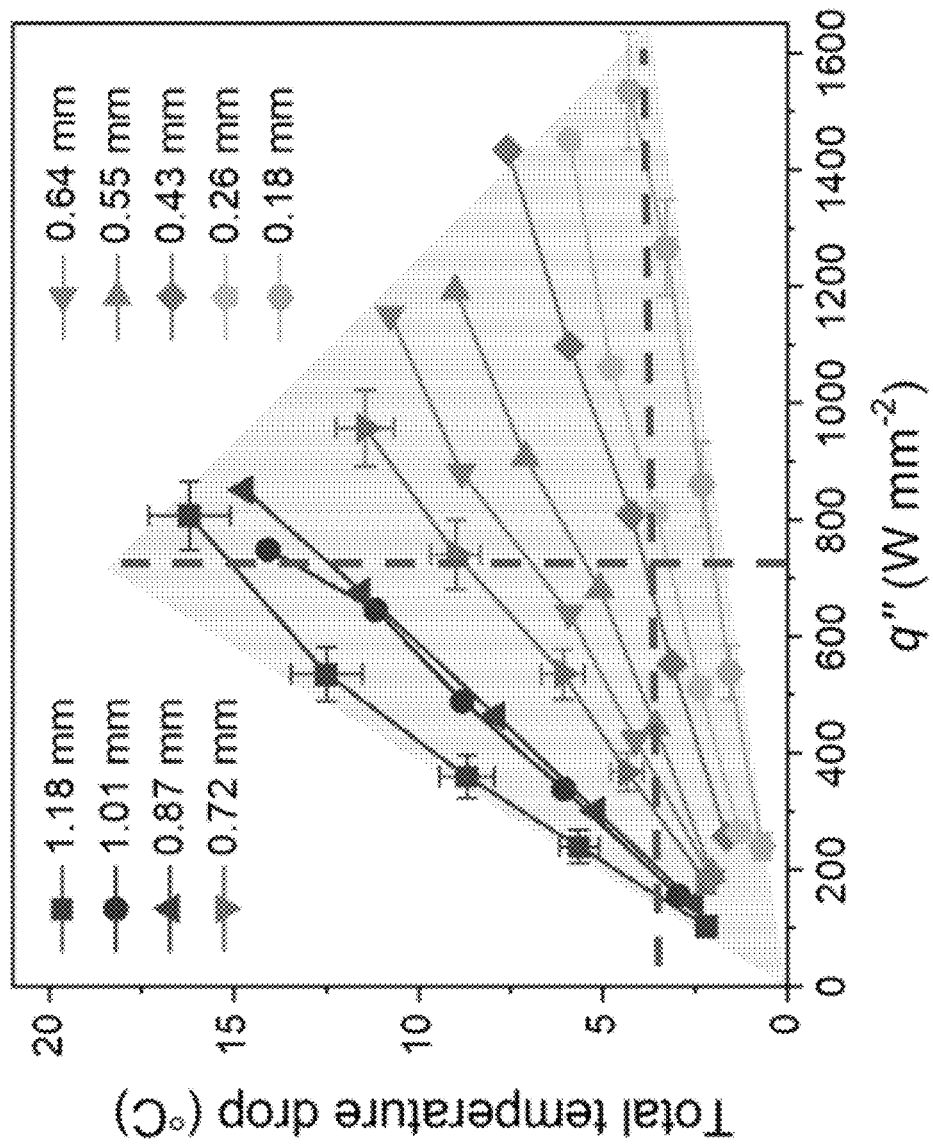

FIG. 4B shows that the total temperature drop at each thickness increased approximately linearly with increasing heat flux, and that the temperature rise increased with increasing thickness. The shaded region in FIG. 4B illustrates the tunable temperature range available during compression of the tested graphene foam composite. The dashed lines illustrate that the temperature and the heat flux could be fixed at a desired value while the heat flux and temperature, respectively, were allowed to vary if the thickness of the graphene foam composite was adjusted appropriately. At a given thickness, the slope of the temperature rise with heat flux ($\Delta T/q''$) was the total thermal resistance across the graphene foam composite, which was inversely proportional to the thermal conductance (shown in FIG. 4C). Compared to traditional thermal switches which only have a high and low value, the tested graphene foam composite was observed to smoothly achieve continuous tuning of thermal conductance between the fully-compressed and uncompressed states. At a strain of about 85%, the switching ratio based on the ratio of the thermal conductance at the fully-compressed and uncompressed states was about 8.09.

Figure 4C:
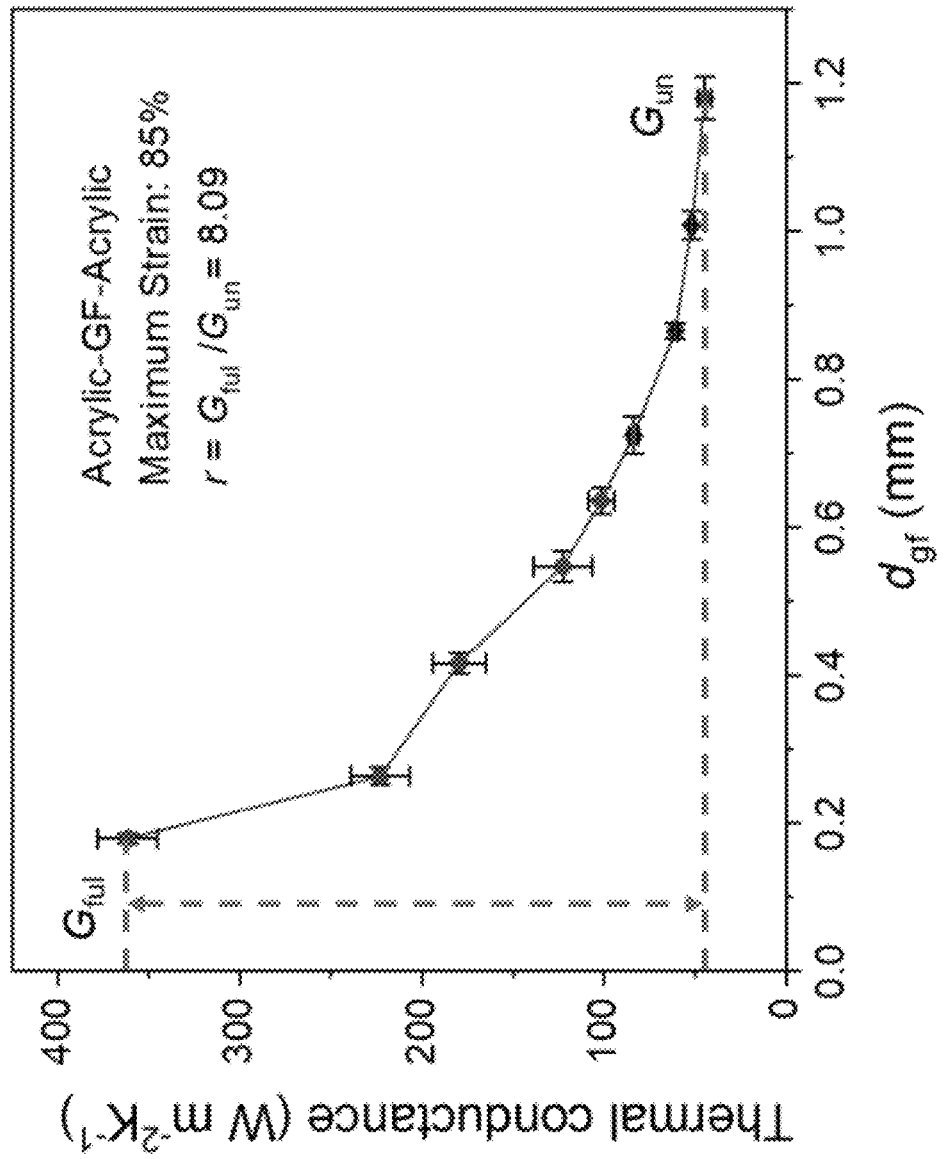
Figure 4D:
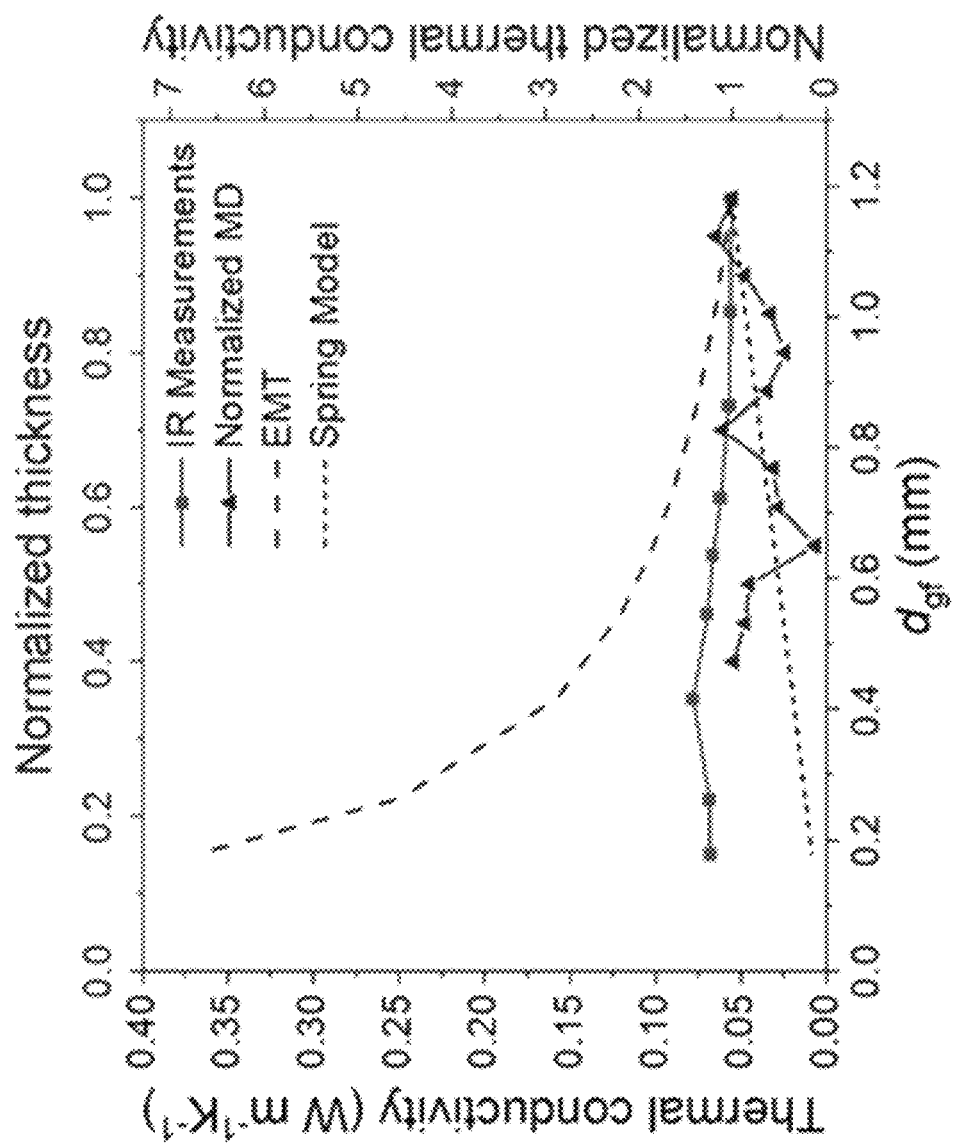
Figure 4E:
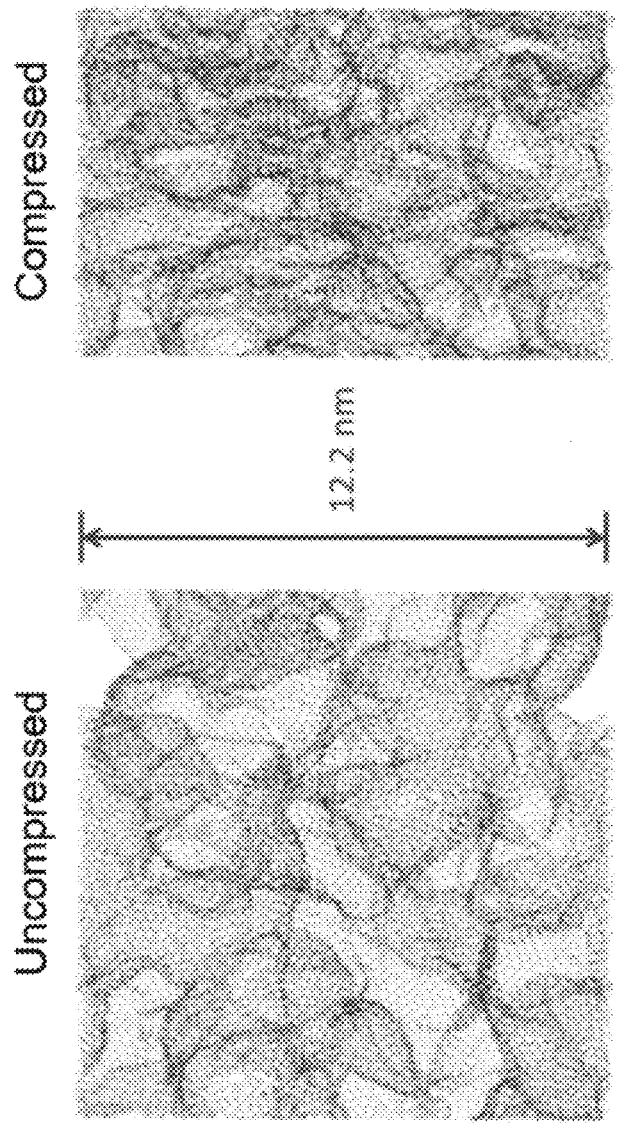

The measured thermal conductivity of the graphene foam composite is illustrated in FIG. 4C and shows intriguing behavior. the thermal conductivity increased with increasing mass density (decreasing thickness), but much more slowly as compared to the conventional effective medium theory (EMT) for porous media, where thermal conductivity increases almost linearly with mass density (i.e., thermal conductivity is inversely proportional to thickness) as more thermal pathways are available within a unit volume after compression. To better elucidate the microscopic mechanism behind the dynamic thermal transport, the thermal conduction in compressed graphene foams was predicted using molecular dynamics (MD) simulations. The graphene foam in MD was much scaled down from the actual graphene foam composite used in the experiment but provided useful and relevant insights. The thermal conductivity at each compression level was calculated and the results normalized with respect to the uncompressed state, are plotted in FIG. 4D on the secondary axis (the corresponding thermal conductivities from experiment are plotted on the primary axis). It should be noted that the predicted thermal conductivity had a considerable level of oscillation due to the flexible nature of the graphene foam composite. Interestingly, the MD calculated thermal conductivity initially decreased and then increased with increasing mass density (decreasing thickness). To explain this unexpected initial decreasing trend, a 1D spring model was proposed with variable thickness x between the heat source and heat sink. Briefly, the effective thermal conductance ($k_{eff} \cdot x^{-1}$) across the spring remained constant with varying x, since heat traveled the same distance through the coils of the spring wire (assuming adjacent spring coils do not come in contact). Therefore, the effective thermal conductivity ($k_{eff}$) decreased with decreasing thickness (x), which explained the initial compression trend in MD. Once the graphene foam composite was compressed more and the ligaments started to make contact, the thermal conductivity started to increase, as revealed by the MD simulation. The experimental data are now bounded between the EMT and the spring model, indicating that both mechanisms influence the thermal behavior of the graphene foam composite under compressive loading. The MD results initially follow the spring model as compression occurs and then show features of the EMT. Overall, this comparison revealed that the dependence of thermal conductivity on mass density due to compression is distinctive from that due to initial growth density for porous media.

To evaluate the performance of the experimental variable thermal resistor, a proof-of-concept experiment was conducted in an environmental chamber with varying ambient temperature. A film electrical heater, clamped between a thermal insulator and an aluminum bar, served as a heat source. The input power was tuned by controlling the applied power and calibrated by a multimeter. The graphene foam composite was placed between the aluminum bar and a heat sink and was compressed by the heat sink. The distance of movement (the compressed thickness of the graphene foam composite) was measured by an indicator with accuracy of ±0.0001 inch. T-type thermocouples, coated with heat-conducting epoxy, were inserted into holes of the aluminum bar and the heat sink. Another thermocouple was floating in the air to ensure the temperature adjustment of the chamber was steady. The temperature variation with the thickness and heat flux was recorded by a data logger with an accuracy of ±1.7° C. The temperature of one thermocouple in the aluminum bar was taken as the temperature of the graphene foam composite. The graphene foam composite and the heat sink were taken as the total resistance in the system. The average thermal resistance of the heat sink was separately measured at 1.64 K W$^{-1}$, which was 4.8% and 39.6% of the resistance of the graphene foam composite at the uncompressed and fully-compressed states, respectively.

To test the temperature regulation capacity of the graphene foam composite, the input heat flux was fixed at 3023 W m$^{-2}$ and the ambient temperature was adjusted to 0° C., 10° C., 20° C., and 30° C. The graphene foam composite was first set at the uncompressed ("off") state, and then compressed by 10% of the original thickness each time until the maximum compression was achieved (the "on" state). At each thickness of the graphene foam composite, the variable thermal resistor was allowed to achieve steady state.

Figure 5B:
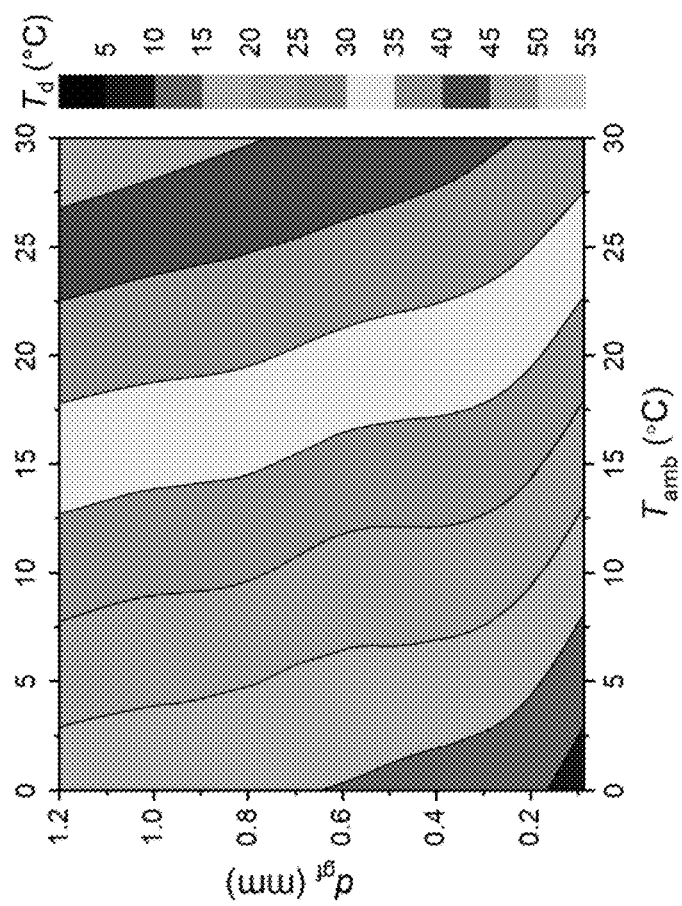
FIGS. 5A through 5D represent performance of the investigated variable thermal resistor as a thermal regulator (FIGS. 5A and 5B) and as a thermal switch (FIGS. 5C and 5D).
Figure 5A:
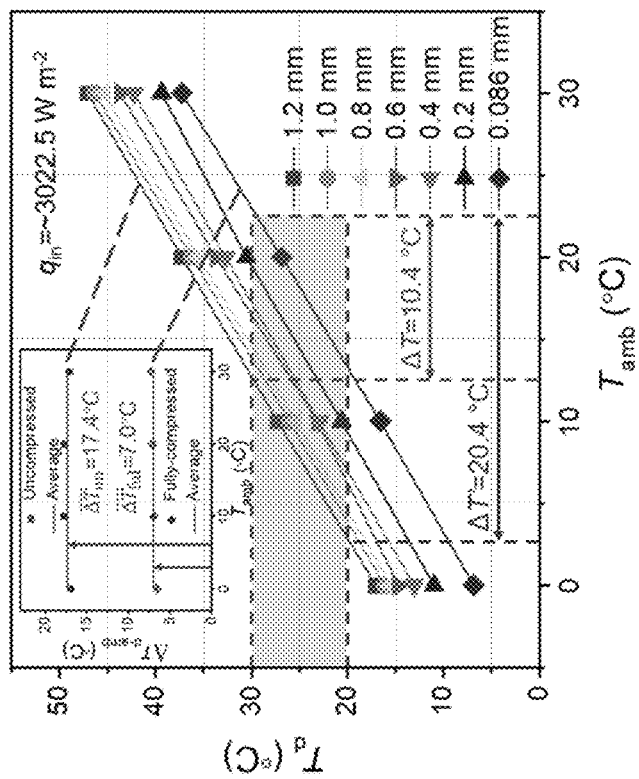

For a constant heat input, FIG. 5A shows the temperature of the graphene foam composite as a function of ambient temperature for different thicknesses of the graphene foam composite. The approximately linear relationship between the ambient temperature and the temperature of the variable thermal resistor at the same thickness of graphene foam composite indicates no major non-linearity in properties or performance with temperature. The average temperature differences between the variable thermal resistor and ambient temperatures were 17.4° C. and 7.0° C. for the uncompressed and fully-compressed states, respectively, yielding a switching ratio of about 2.5. The switching ratio is likely lower in application than in the thermal property testing because of the other parallel heat loss pathways in this system, but can be optimized.

The same data is illustrated in a contour plot in FIG. 5B and shows that the temperature of the graphene foam composite can be continuously tuned across a temperature window of about 10° C. (illustrated by the center and rightmost vertical dashed lines in FIG. 5A) at this input heat flux for each ambient temperature condition. To maintain the graphene foam composite at a constant temperature with varying ambient conditions, the thickness $d_{gf}$ of the graphene foam composite should be tuned by following the desired isotherm. If the desired temperature is not a fixed point, but a range, such as from 20° C. to 30° C., the temperature window over which the graphene foam composite can operate expands to 20.4° C. (displayed by the shaded region and the range between the leftmost and rightmost vertical dashed lines in FIG. 5A).

To further explore the operational performance of the continuously tunable variable thermal resistor, the impact was explored of varying input power to the graphene foam composite corresponding to heat fluxes from about 1.57 kW m$^{-2}$ to about 6.05 kW m$^{-2}$ when the ambient temperature was held at 20° C. (see FIGS. 5C and 5D). After the variable thermal resistor reached a steady state, the graphene foam composite was compressed by 10% of its thickness and the variable thermal resistor was allowed to reach steady state. This process was repeated until the graphene foam composite was compressed to its reachable minimum thickness. Then, the graphene foam composite was expanded to its original thickness and the power was reduced and the process was repeated at about 4.80 kW m$^{-2}$, about 3.02 kW m$^{-2}$, and about 1.57 kW m$^{-2}$.

Figure 5D:
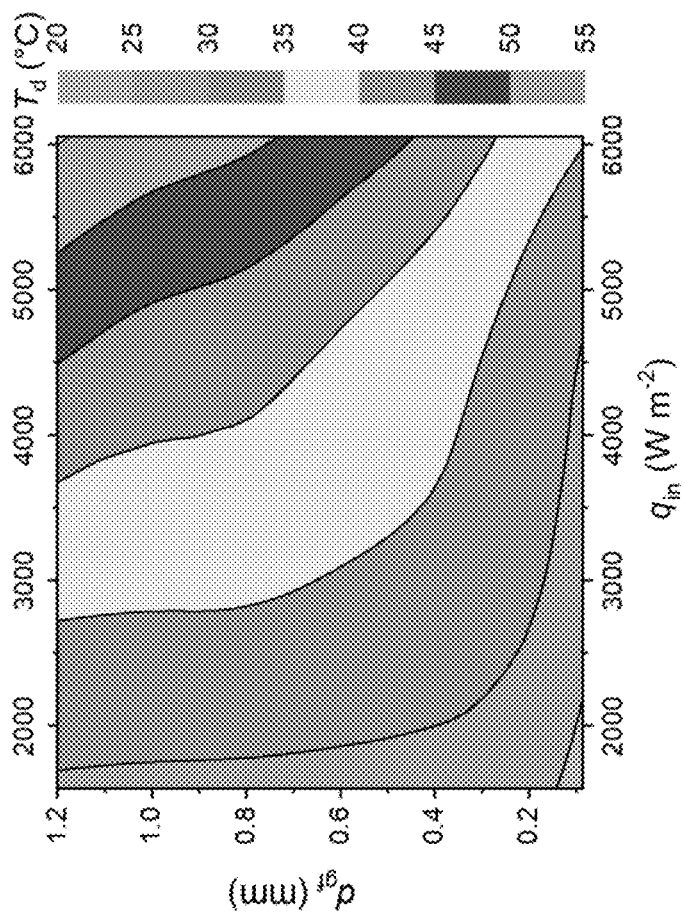
Figure 5C:
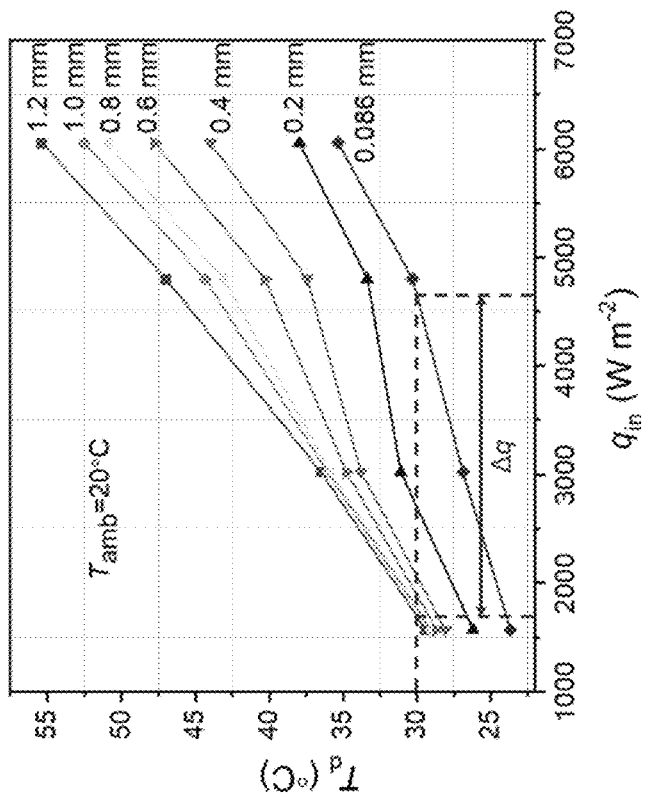

The temperature of the graphene foam composite increased as the heat flux increased and temperature difference between the uncompressed and fully-compressed states was larger for the higher heat flux than that in lower heat flux cases as the temperature difference from the graphene foam composite to ambient ($T_d - T_{amb}$) scaled approximately linearly with heat flux. The contour plot of FIG. 5D illustrates that the temperature of the graphene foam composite can also be maintained at a desired value by adjusting the thickness of the graphene foam composite as the heat flow varies. When the temperature of the graphene foam composite was held at 30° C., the heat flux window varied by about 3 kW m$^{-2}$, or a factor of about 2.7 (displayed by the leftmost vertical dashed line in FIG. 5C).

Figure 6B:
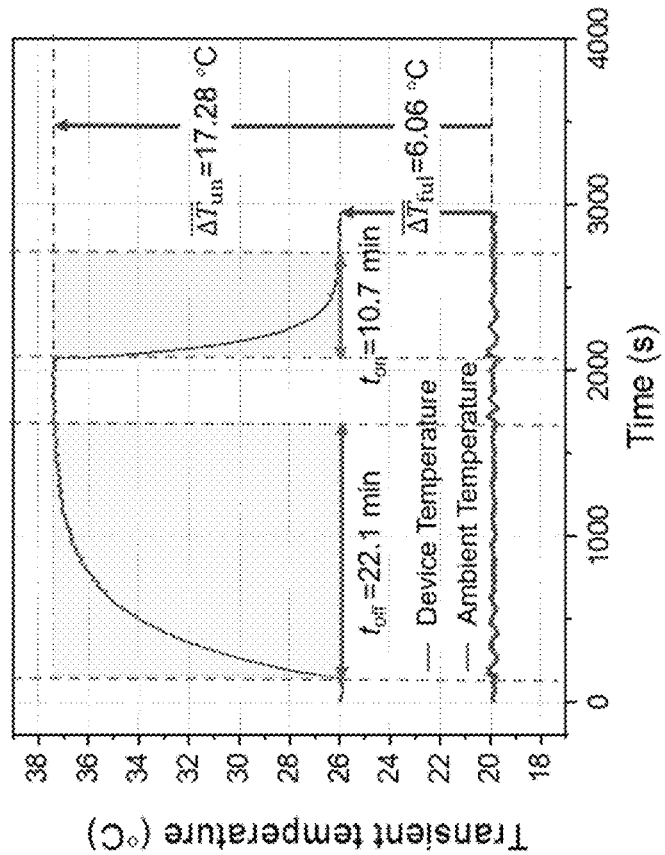
FIGS. 6A and 6B represent performance on reliability and response time of the variable thermal resistor.
Figure 6A:
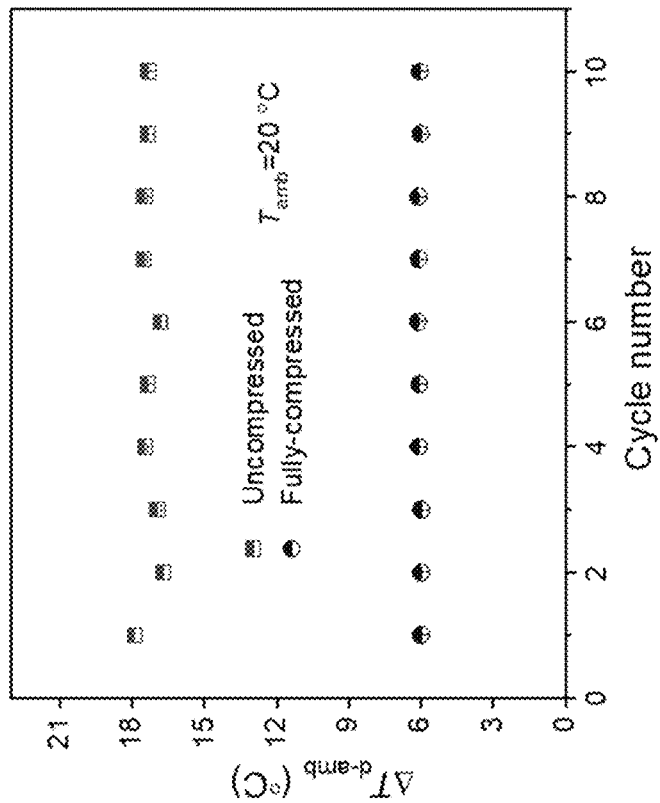

To investigate the reliability of a graphene foam-based variable thermal resistor in temperature regulation, the variable thermal resistor was cycled between the fully-compressed and uncompressed states for 10 cycles (FIG. 6A). The temperature difference between the variable thermal resistor and the environment demonstrated an average switch ratio of 2.9 with a standard error of 2%. FIG. 6B shows the evolution of the temperature of the graphene foam composite during cycling. It took 22.1 minutes to raise the temperature of the graphene foam composite by about 11.2° C. when transitioning from the fully-compressed ("on") state to the uncompressed ("off") state. In contrast, the time spent in cooling the graphene foam composite after compressing again was only 10.7 minutes. This contrast in the off-on and on-off transition was logical as the system time constant should scale with the thermal resistance of the graphene foam composite. For the uncompressed state, the graphene foam composite had higher thermal resistance and a longer system time constant. For the compressed state, the resistance was lower and the time constant reduced. Further, the ability to quickly cool when compressing might aid in preventing thermal runaway or system damage. The time constant could be significantly shortened if the aluminum bar was reduced or removed, which may be practical in commercial applications, whereas it was needed for the experimental investigations for measurements using thermocouples. The full transient temperature response of 10 continuous cycles showed that the time constants were stable. The stress-strain relation measured in a compress-release cycle of the graphene foam composite confirmed the robustness of the graphene foam composite and small hysteresis of its mechanical properties.

As indicated by the above investigations, an all solid-state, wide-range variable thermal resistor based utilizing a compressible graphene foam is more versatile than conventional thermal switches that only possess two discrete "on" and "off" states. Characterization of the thermal properties of the graphene foam composite demonstrated that the temperature and heat flux can be both tuned with dual functionality of thermal switching and thermal regulation. The switching ratio at the maximum compression of 85% was about 8. For a heat flux of about 3 kW m$^{-2}$, the adjustable temperature window was about 10° C. between the fully-compressed and uncompressed states, enabling stabilization of a temperature of the graphene foam composite during operation in varying ambient conditions. Meanwhile, the reliability and reasonable response time permit the compressible graphene foam composite to be an optimal all solid-state candidate for dynamic thermal management.

While the invention has been described in terms of specific or particular embodiments and investigations, it should be apparent that alternatives could be adopted by one skilled in the art. For example, the variable thermal resistor and its components could differ in appearance and construction from the embodiments described herein and shown in the drawings, functions of certain components of the variable thermal resistor could be performed by components of different construction but capable of a similar (though not necessarily equivalent) function, process parameters such as temperatures and durations could be modified, and appropriate materials could be substituted for those noted. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the claims.

The invention claimed is:
1. A variable thermal resistor comprising;
a heat source;
a heat sink;
a reversibly-compressible, open-pore graphene foam composite between the heat source and the heat sink, the graphene foam composite comprising a graphene foam with polydimethylsiloxane embedded therein, the graphene foam composite having a thickness between the heat source and the heat sink; and
means for compressing the thickness of the graphene foam composite and controlling a degree of compression of the thickness of the graphene foam composite;
wherein the variable thermal resistor is a thermal device chosen from the group consisting of thermal regulators and thermal switches, the variable thermal resistor has a plurality of intermediate thermal conductance states between a minimum achievable thermal conductance and a maximum achievable thermal conductance, and the variable thermal resistor is configured to controllably vary heat transport therethrough by controlling the degree of compression of the thickness of the graphene foam composite with the compressing means.
2. The variable thermal resistor of claim 1, wherein the variable thermal resistor is configured to function with a high thermal conductance state corresponding to when the graphene foam composite is in a fully compressed state, a low thermal conductance state corresponding to when the graphene foam composite is in a fully uncompressed state, and a plurality of intermediary thermal conductance states corresponding to when the graphene foam composite is partially compressed to achieve continuous tuning of thermal conductance between the fully compressed and fully uncompressed states.

3. The variable thermal resistor of claim 1, wherein the polydimethylsiloxane serves as a scaffold or binder for graphene.

4. The variable thermal resistor of claim 1, wherein the graphene foam composite comprises a pore size of between about 125 to 350 μm when fully uncompressed.

5. A system comprising a heat source, a heat sink, and a heat dissipation pathway for heat transport between the heat source and the heat sink, the heat dissipation pathway comprising:
- a variable thermal resistor comprising a reversibly-compressible, open-pore graphene foam composite between the heat source and the heat sink, the graphene foam composite comprising a graphene foam with an elastomeric material embedded therein, the graphene foam composite having a thickness between the heat source and the heat sink;
- means for compressing the thickness of the graphene foam composite; and
- active controls for controlling a degree of compression of the thickness of the graphene foam composite;
- wherein the variable thermal resistor is a thermal device chosen from the group consisting of thermal regulators and thermal switches, the variable thermal resistor has a plurality of intermediate thermal conductance states between a minimum achievable thermal conductance and a maximum achievable thermal conductance, and the variable thermal resistor is configured to controllably vary heat transport therethrough by controlling the degree of compression of the graphene foam composite with the compressing means.

6. The system of claim 5, wherein the variable thermal resistor is configured to function with a high thermal conductance state corresponding to when the graphene foam composite is in a fully compressed state, a low thermal conductance state corresponding to when the graphene foam composite is in a fully uncompressed state, and a plurality of intermediary thermal conductance states corresponding to when the graphene foam composite is partially compressed to achieve continuous tuning of thermal conductance between the fully compressed and fully uncompressed states.

7. The system of claim 5, wherein the elastomeric material comprises polydimethylsiloxane and serves as a scaffold or binder for graphene.

8. The system of claim 5, wherein the graphene foam composite comprises a pore size of between about 125 to 350 μm when fully uncompressed.

9. The system of claim 5, wherein the active controls modulate the variable thermal resistor to have constant uniform temperatures in varying ambient environments and with varying heat loads.

10. The system of claim 5, wherein the heat source is a battery.

* * * * *